April 15, 1941.    R. L. OHLS    2,238,706

TOOL JOINT

Filed Oct. 12, 1939

INVENTOR.
ROBERT L. OHLS.
By J. Vincent Martin
and
Ralph R. Browning
ATTORNEYS

Patented Apr. 15, 1941

2,238,706

UNITED STATES PATENT OFFICE 2,238,706

TOOL JOINT

Robert L. Ohls, Houston, Tex., assignor to Reed Roller Bit Company, Houston, Tex., a corporation of Texas Application October 12, 1939, Serial No. 299,083

3 Claims. (Cl. 285—174)

This invention relates to threadless pipe couplings, and more particularly to those used in connecting the sections of drill pipe in rotary oil well drilling. Its general object is to provide a quickly and easily assembled leakproof pipe joint.

In this art it has long been customary to connect the section by means of collars and conical threaded portions. Since the entire string of drill pipe must be pulled whenever the bit is changed, necessitating the uncoupling of at least a third of the joints, the great frequency with which these threaded joints are screwed and unscrewed creates certain disadvantages. For instance, when a stand of drill pipe is lowered to insert its threaded portion for screwing into that of the stand already in the hole, the threads are subjected to considerable impact and scraping which will, in time, impair their effectiveness. Further, a considerable proportion of the time required in running or pulling the drill pipe is consumed in the screwing, tightening, breaking out and unscrewing operations which are necessitated by screw threads. Various couplings have been developed to overcome these detriments, but, so far as I am aware, no threadless coupling embodying the features and advantages of my invention has heretofore been developed.

The object of my invention is an efficient, quickly attachable joint which will not wear or become injured in the coupling and uncoupling operations.

Another object is to provide such a joint which will be leakproof.

Another object is to provide such a joint which will transmit torque without relative rotation of its parts.

Another object is to provide such a joint which will transmit torque in both directions of rotation without becoming disconnected.

Other objects and features will become evident from the following disclosure when taken in connection with the accompanying drawing, in which Fig. 1 is a side view, partly in longitudinal cross section, of my invention applied to a drill pipe joint;

Figure 1:
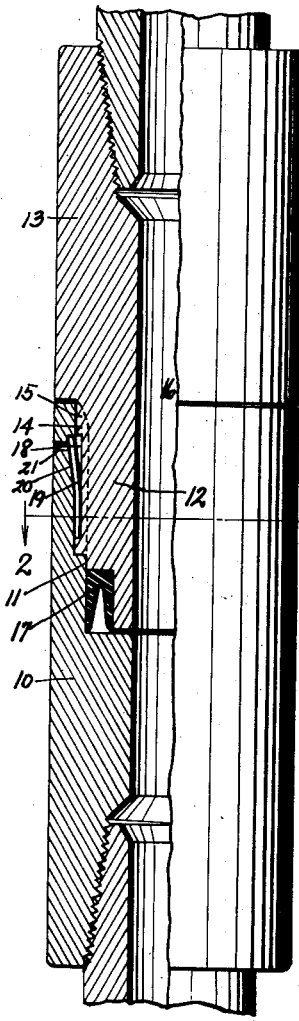
Figure 3:
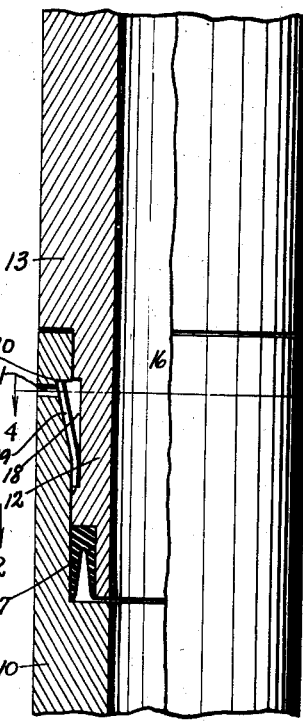
Fig. 3 is a side view, partly in section, of my invention applied directly to the ends of two pipes.
Figure 6:
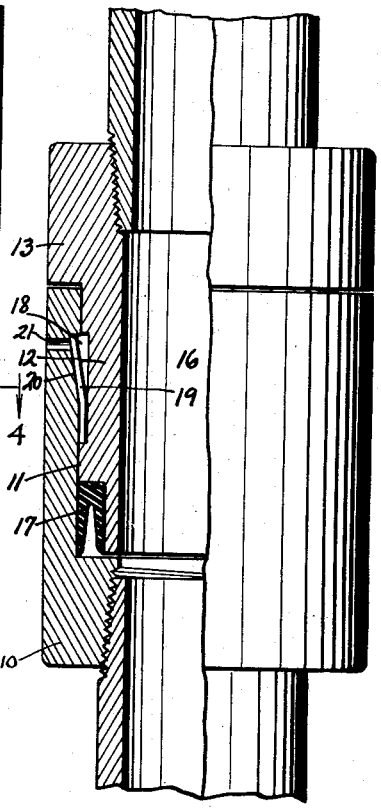
Fig. 6 is a side view, partly in longitudinal cross section of a pipe coupling embodying my invention.
Figure 2:
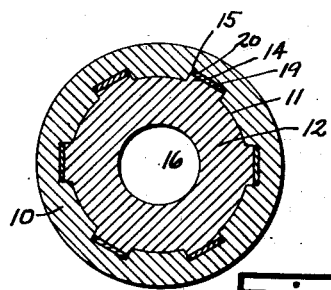
Fig. 2 is a cross section taken along line 2—2 of Fig. 1.
Figure 4:
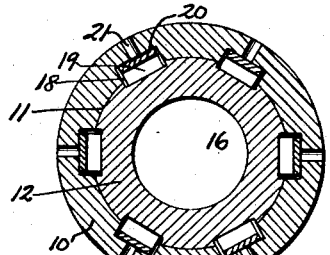
Fig. 4 is a cross section taken along line 4—4 of Fig. 3.

Referring to the drawing in detail, a box, or female half 10 of the coupling has formed therein a socket 11 which is shaped to receive the pin or reduced portion 12 of the male half 13. Two forms of socket and pin structure are illustrated. In Figs. 3 to 6, I show a smooth bore coupling for use in pipes generally, but where the pipe is to be used to transmit torque of high value, such as in drill pipes, the splined form shown in Figs. 1 and 2 is preferred. Here the pin 12 is formed with splines 14 which co-act with grooves 15 of the socket 11. In either case, the bore 16 is made uniform in diameter throughout both male and female members, and a fluid seal 17, of conventional construction, may be placed at the bottom of the socket to form a fluid tight coupling.

Formed in the side of the pin 12 there are depressions or hollows 18 within which leaf springs 19 are securely welded or riveted at their lower ends to the pin 12. Their upper or free ends are biased outwardly, and recesses 20, turned in the side of socket 11, are shaped to accommodate these free ends of the springs so that, when the male and female halves of the coupling are pushed together, the springs will enter the recesses and the free ends of the springs, abutting the ends of the recesses, will securely hold the two halves in coupled relation.

In order to enable the springs to be released from the recesses for detaching the two halves of the coupling, apertures 21 are provided, being drilled through the walls of sockets 11 into recesses 20. It will be evident that a pin shaped tool may be inserted into the aperture and depress the spring so that it clears the recess for withdrawal.

I accomplish this detaching operation by a collar (not shown) which carries a plurality of inwardly projecting pins positioned to enter all the apertures 21 simultaneously. When the collar is tightened around the female half 10, with the pins pressing into the apertures, the springs 19 are released and the male half may be withdrawn.

Figure 5:
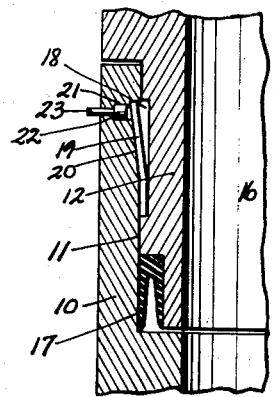
Fig. 5 is a side view in longitudinal cross section of a modified form of my invention.

In Figure 5 I show a slightly modified form of my invention. In this embodiment the structure is similar to that described above, with the addition of captive pins 22 permanently held in the apertures 21 by means of reduced shanks 23 which protrude on the side of the female half 10. The operation of this modification is the same, except that, in uncoupling, a smooth collar is placed around the female half to press inwardly on the pin shanks 23 and release the springs 19.

It will be evident that I have produced a coupling which is applicable to any form of pipe, including the torque transmitting type, and which may be quickly and efficiently coupled by merely inserting, without rotation, the male half into the female half. Although preferred embodiments are shown and disclosed herein, I do not wish to be limited to these forms, but only to the scope of the appended claims.

I claim:

1. In a pipe coupling, a female portion and a male portion shaped to be fitted therein by non-rotary motion, a plurality of depressions in the wall of the male portion, leaf springs in the said depressions extending parallel to the longitudinal axis with their fixed ends toward the end thereof and biased outwardly, a plurality of undercut recesses in the female portion having inwardly extending shoulders, said recesses corresponding to said depressions in the wall of the male portion extending parallel to the longitudinal axis and positioned to receive the free ends of said springs, said springs and said recesses being out of the path of the fluid being conducted through said coupling, apertures in the wall of the female portion positioned for access to the recesses for depressing said springs out of said recesses, and said male portion and said female portion having splines on the adjacent walls adapted to interengage when the parts are together for the transmission of torque.

2. In a pipe coupling, a female portion and a male portion shaped to be fitted therein by non-rotary motion, a plurality of depressions in the wall of the male portion, leaf springs in the said depressions extending parallel to the longitudinal axis with their fixed ends toward the end thereof and biased outwardly, a plurality of undercut recesses in the female portion having inwardly extending shoulders, said recesses corresponding to said depressions in the wall of the male portion extending parallel to the longitudinal axis and positioned to receive the free ends of said springs, said springs and said recesses being out of the path of the fluid being conducted through said coupling, apertures in the wall of the female portion positioned for access to the recesses for depressing said springs out of said recesses, and said male portion and said female portion having means on the adjacent walls adapted to interengage when the parts are together for the transmission of torque.

3. In a pipe coupling, a female portion, a male portion shaped to be fitted therein by non-rotary motion, depressions in the wall of the male portion, leaf springs in the said depressions extending parallel to the longitudinal axis with their fixed ends toward the end thereof and biased outwardly, undercut recesses in the female portion having inwardly extending shoulders, said recesses corresponding to said depressions in the wall of the male portion and positioned to receive the free ends of said springs, said springs and said recesses being out of the path of the fluid being conducted through said coupling, apertures in the wall of the female portion positioned for access to the recesses, pins carried in the apertures, said pins being of such a length that one end protrudes from the female portion whereby pressure on this end of the pin will depress the pin and disengage the same from the recess, said leaf springs and said recesses adapted to interengage when the parts are together to prevent relative rotary motion of the parts.

ROBERT L. OHLS.